United States Patent
Sweet et al.

(12) United States Patent (10) Patent No.: US 9,217,376 B2
(45) Date of Patent: Dec. 22, 2015

(54) MULTI-MODE ADAPTIVE FAIL-FIXED SYSTEM FOR FADEC CONTROLLED GAS TURBINE ENGINES

(75) Inventors: David H. Sweet, Jupiter, FL (US); Stephen H. Silder, Palm City, FL (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1049 days.

(21) Appl. No.: 13/121,209

(22) PCT Filed: Nov. 13, 2008

(86) PCT No.: PCT/US2008/083330
§ 371 (c)(1),
(2), (4) Date: Mar. 28, 2011

(87) PCT Pub. No.: WO2010/056241
PCT Pub. Date: May 20, 2010

(65) Prior Publication Data
US 2011/0173988 A1    Jul. 21, 2011

(51) Int. Cl.
F02C 9/26 (2006.01)
B64D 31/06 (2006.01)
(Continued)

(52) U.S. Cl.
CPC ............... *F02C 9/263* (2013.01); *B64D 31/06* (2013.01); *F02C 9/22* (2013.01); *F02C 9/44* (2013.01);
(Continued)

(58) Field of Classification Search
CPC ............... F02C 9/28; F02C 9/32; F02C 9/16; F02C 9/22; F02C 9/26; F02C 9/46; F02C 9/263; F02C 7/22; F05B 2270/103; F05B 2270/1011; F05B 2270/094; F05B 2270/09; F23N 5/184; B64D 31/00; B64D 31/06; B64D 31/08

USPC ................... 60/772, 773, 734, 239, 238, 779, 60/39.281, 39.23, 39.24
See application file for complete search history.

(56) References Cited

U.S. PATENT DOCUMENTS 3,820,323 A    6/1974    Burnell et al.
3,840,200 A    10/1974    Lambregts
(Continued)

FOREIGN PATENT DOCUMENTS

FR    2803051    6/2001
GB    2272783    5/1994
(Continued)

OTHER PUBLICATIONS

Supplementary European Search Report, dated Mar. 27, 2012, EP Application No. 08878182.8.
(Continued)

*Primary Examiner* — Phutthiwat Wongwian
*Assistant Examiner* — Alain Chau
(74) *Attorney, Agent, or Firm* — Carlson, Gaskey & Olds, P.C.

(57) ABSTRACT

A gas turbine engine control system according to an exemplary aspect of the present disclosure includes, among other things, an automatic control operable to control a gas turbine engine. The gas turbine engine control system further comprises a module operable to fail-fix the gas turbine engine to one of a multiple of pre-determined modes in response to failure of the automatic control. The exemplary gas turbine engine control system may further comprise a fuel flow meter to sense a fuel flow to the engine, a fuel control to control the fuel flow to the engine, and the module in electrical communication with the fuel flow meter to fix the fuel control in response to one of the multiple of pre-determined modes.

17 Claims, 4 Drawing Sheets

(51) Int. Cl.
  *F02C 9/46* (2006.01)
  *F02C 9/44* (2006.01)
  *F02C 9/22* (2006.01)
  *F23N 5/18* (2006.01)
  *F02C 9/28* (2006.01)

(52) U.S. Cl.
  CPC ... *F02C 9/46* (2013.01); *F02C 9/26* (2013.01); *F02C 9/28* (2013.01); *F05D 2270/09* (2013.01); *F05D 2270/094* (2013.01); *F23N 2005/185* (2013.01)

(56) References Cited

U.S. PATENT DOCUMENTS

| | | | |
|---|---|---|---|
| 3,922,955 A * | 12/1975 | Kast | 91/461 |
| 3,969,890 A | 7/1976 | Nelson | |
| 4,137,707 A | 2/1979 | Wanger | |
| 4,248,040 A * | 2/1981 | Kast | 60/39.27 |
| 4,276,809 A | 7/1981 | Kast | |
| 4,423,593 A | 1/1984 | Zagranski et al. | |
| 4,551,972 A | 11/1985 | Lewis | |
| 4,608,820 A | 9/1986 | White et al. | |
| 4,718,229 A | 1/1988 | Riley | |
| 4,765,133 A * | 8/1988 | Krukoski | F02C 9/28 60/39.281 |
| 4,773,213 A * | 9/1988 | Krukoski | F02C 9/28 60/39.281 |
| 4,794,755 A * | 1/1989 | Hutto, Jr. | F02C 9/28 60/39.281 |
| 4,831,819 A | 5/1989 | Norris et al. | |
| 4,835,654 A | 5/1989 | Riley | |
| 4,998,202 A | 3/1991 | Walsh et al. | |
| 5,231,823 A | 8/1993 | Curran et al. | |
| 5,363,317 A * | 11/1994 | Rice | G07C 3/00 701/100 |
| 5,403,155 A | 4/1995 | Head et al. | |
| 5,408,412 A | 4/1995 | Hogg et al. | |
| 5,440,490 A * | 8/1995 | Summerfield | 701/100 |
| 5,490,379 A * | 2/1996 | Wernberg | F02C 9/46 60/39.281 |
| 5,555,720 A | 9/1996 | Wernberg et al. | |
| 5,613,652 A | 3/1997 | Greene | |
| 5,656,966 A | 8/1997 | Wilmot et al. | |
| 5,784,884 A | 7/1998 | Poerio et al. | |
| 5,852,381 A | 12/1998 | Wilmot et al. | |
| 6,122,575 A | 9/2000 | Schmidt et al. | |
| 6,148,179 A | 11/2000 | Wright et al. | |
| 6,160,998 A | 12/2000 | Wright et al. | |
| 6,163,681 A | 12/2000 | Wright et al. | |
| 6,167,238 A | 12/2000 | Wright | |
| 6,167,239 A | 12/2000 | Wright et al. | |
| 6,173,159 B1 | 1/2001 | Wright et al. | |
| 6,353,734 B1 | 3/2002 | Wright et al. | |
| 6,411,869 B2 | 6/2002 | Permanne | |
| 6,655,151 B2 | 12/2003 | Mahoney et al. | |
| 6,698,181 B2 | 3/2004 | Certain | |
| 6,715,278 B2 | 4/2004 | Demers | |
| 6,751,942 B2 | 6/2004 | Mahoney et al. | |
| 6,912,837 B2 * | 7/2005 | Demers | 60/39.281 |
| 7,107,131 B2 | 9/2006 | MacDougall | |
| 7,148,814 B2 | 12/2006 | Sikora et al. | |
| 7,197,430 B2 | 3/2007 | Jacques et al. | |
| 7,310,573 B2 | 12/2007 | Stickling | |
| 7,328,098 B1 | 2/2008 | VanderLeest et al. | |
| 7,560,881 B2 * | 7/2009 | Anson | F02C 7/232 123/495 |
| 2002/0171005 A1 | 11/2002 | Claudet | |
| 2007/0180813 A1 * | 8/2007 | Pickard et al. | 60/39.281 |

FOREIGN PATENT DOCUMENTS

| | | |
|---|---|---|
| GB | 2355081 | 4/2001 |
| JP | 2004162698 A | 6/2004 |
| JP | 2005315237 A | 11/2005 |

OTHER PUBLICATIONS

Search Report and Written Opinion mailed on Aug. 13, 2009 for PCT/US2008/083330.

* cited by examiner

MULTI-MODE ADAPTIVE FAIL-FIXED SYSTEM FOR FADEC CONTROLLED GAS TURBINE ENGINES

BACKGROUND

The present disclosure relates to gas turbine turbo-shaft engines and more particularly to a system and method for transfer to a backup system in response to an automatic engine control failure.

Gas turbine engines often employ Full Authority Digital Engine Control (FADEC) systems for engine management. Traditionally, these are one or two channel configurations with a backup capability to control the engine manually following total loss of automatic control. These manual backup control systems may be relatively expensive, complicated and impose a weight penalty.

With the advent of more reliable and redundant automatic engine control systems, the requirement for a manual backup system has diminished to the extent that many integrated designs delete the manual backup system entirely. Consequently, complete loss of automatic control results in immediate shut down of the affected engine. Statistical analyses of various failure modes and probabilities have supported removal of the manual backup system for commercial aircraft applications, but such rational may not be applicable to combat aircraft where the probabilities for total loss of engine control include other potentialities such as ballistic vulnerabilities; accommodation of redundant controls in a single unit; exposure to intense electromagnetic radiated fields; severe environmental conditions; and other considerations.

Combat aircraft often retain some form of manual backup systems. Operation thereof, however, requires significant coordination between the pilot and copilot. This may be further complicated during particular tactile flight profiles. In addition, manual operation and control may become complicated on gas turbine engines that utilize a variable inlet guide vane (IGV) system.

Given these requirements, some manual backup systems will "fail-fixed" to the fuel flow/power level present at the moment of automatic control loss. Gas turbine engine fuel control systems generally have a steady-state fuel flow boundary and an over/under transient range necessary to achieve maximum acceleration or deceleration of the engine. The more responsive the engine, the larger the transient boundaries. If the engine should fail-fixed within the high fuel flow transient boundary, the engine may eventually suffer damage. Should the engine fail-fixed within the low fuel flow transient boundary, the engine may flame-out.

Furthermore, if the loss of automatic control occurs within the high fuel flow transient boundary, any reduction in power required may result in main rotor system or engine overspeed. That is, if the automatic control fails within the high fuel flow transient boundary, the fuel metering valve is likely in a period of acceleration. By the time the automatic control defaults to the manual backup system, the residual FADEC high fuel demand and the basic inertia of the metering valve system itself will result in a very high, fuel fail-fixed condition. To compensate for the resultant main rotor system or engine overspeed, the aircrew may have to pull collective to absorb the excessive power. This will thereby increase altitude. The altitude increase may require exit from a nap of the earth flight profile and may potentially expose the aircraft to other threats. In addition, to control rotor overspeed, the engine may be operated outside a permitted operation range with respect to speed and temperature and may thereby suffer damage.

Alternatively, if the loss of automatic control occurs within the low fuel flow transient boundary, the result may be essentially equal to an engine shut down. That is, if the automatic control fails during the low fuel transient boundary, the fuel metering value is in a period of deceleration. By the time the automatic control defaults to the manual backup system, commanded fuel flow may be relatively low; lower than the steady-state fuel flow required to maintain the engine on-line. The aircrew has minimal control to increase engine power on the faulted engine and any power required increase will be placed on the other healthy engine(s).

Some manual backup systems may include manual adjustment of the engine power within a limited range through "beeper" trim commands. This manual adjustment requires direct aircrew interaction in which attention may be directed to engine control rather than the flight regime. Furthermore, the limited range of control through the beeper does not provide engine inlet guide vanes (IGVs) operation such that movement within this limited range of control is relatively slow to minimize the potential for engine flame-out or compressor surge.

Current manual control systems may thereby not provide sufficient engine control during the critical moments which follow automatic control failure.

SUMMARY

A gas turbine engine control system according to an exemplary aspect of the present disclosure includes an automatic control operable to control a gas turbine engine and a module operable to fail-fix the gas turbine engine to one of a multiple of pre-determined modes in response to failure of automatic control.

A method for transfer to a backup system in response to automatic engine control failure according to an exemplary aspect of the present disclosure includes identification of a loss of automatic engine control, selecting one of a multiple of pre-determined modes after the identification, and safely operating a gas turbine engine in response to the selected pre-determined mode.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
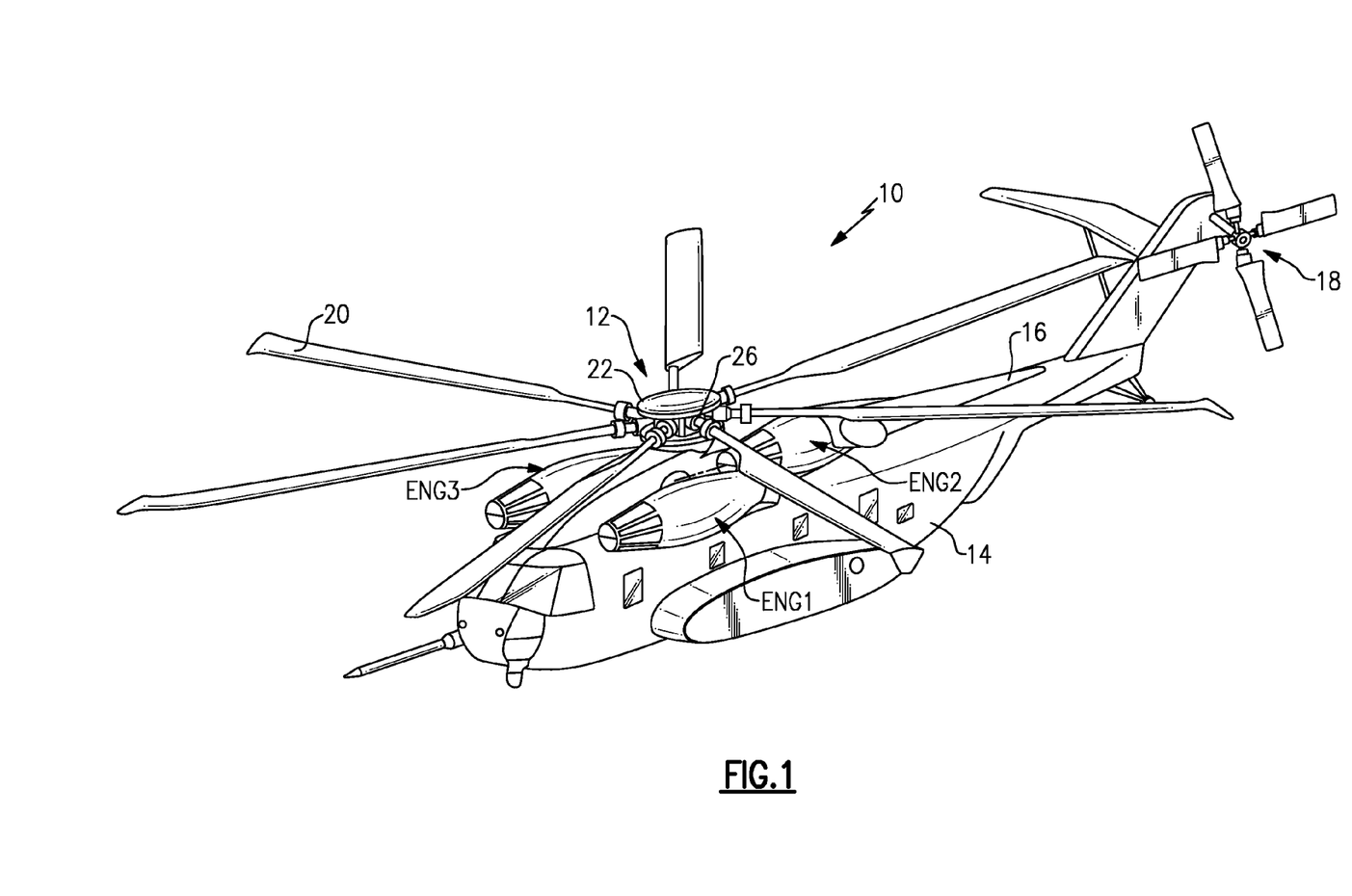
FIG. 1 is a schematic view of a rotary-wing aircraft embodiment for use with the present application.

FIG. 1 schematically illustrates an exemplary vertical take-off and landing (VTOL) rotary-wing aircraft 10 having a main rotor system 12. The aircraft 10 includes an airframe 14 having an extending tail 16 which mounts an anti-torque system 18. The main rotor assembly 12 is driven through a main rotor gearbox (MGB) 20 by a multi-engine powerplant system 22—here having engine packages ENG1, ENG2, ENG3. The multi-engine powerplant system 22 is integrated with the MGB 20 which drives the main rotor assembly 12 and the anti-torque system 18. The multi-engine powerplant system 22 generates the power available for flight operations and couples such power to the main rotor assembly 12 through the MGB 20. The main rotor system 12 includes a multiple of rotor blades 24 mounted to a rotor hub 26. Although a particular helicopter configuration is illustrated and described in the disclosed embodiment, other configurations and/or aircraft, such as high speed compound rotary-wing aircraft with supplemental translational thrust systems, dual contra-rotating, coaxial rotor system aircraft, turbo-props, tilt-rotors, tilt-wing aircraft, conventional takeoff and landing aircraft and other turbine driven machines will also benefit from the disclosure inclusive of single-engine aircraft whereby the retention of the single engine in an adaptive, pre-determined, fail-fixed state may be preferable to an automatic shutdown or a run-away (high side failure) following total loss of automatic control.

Figure 2:
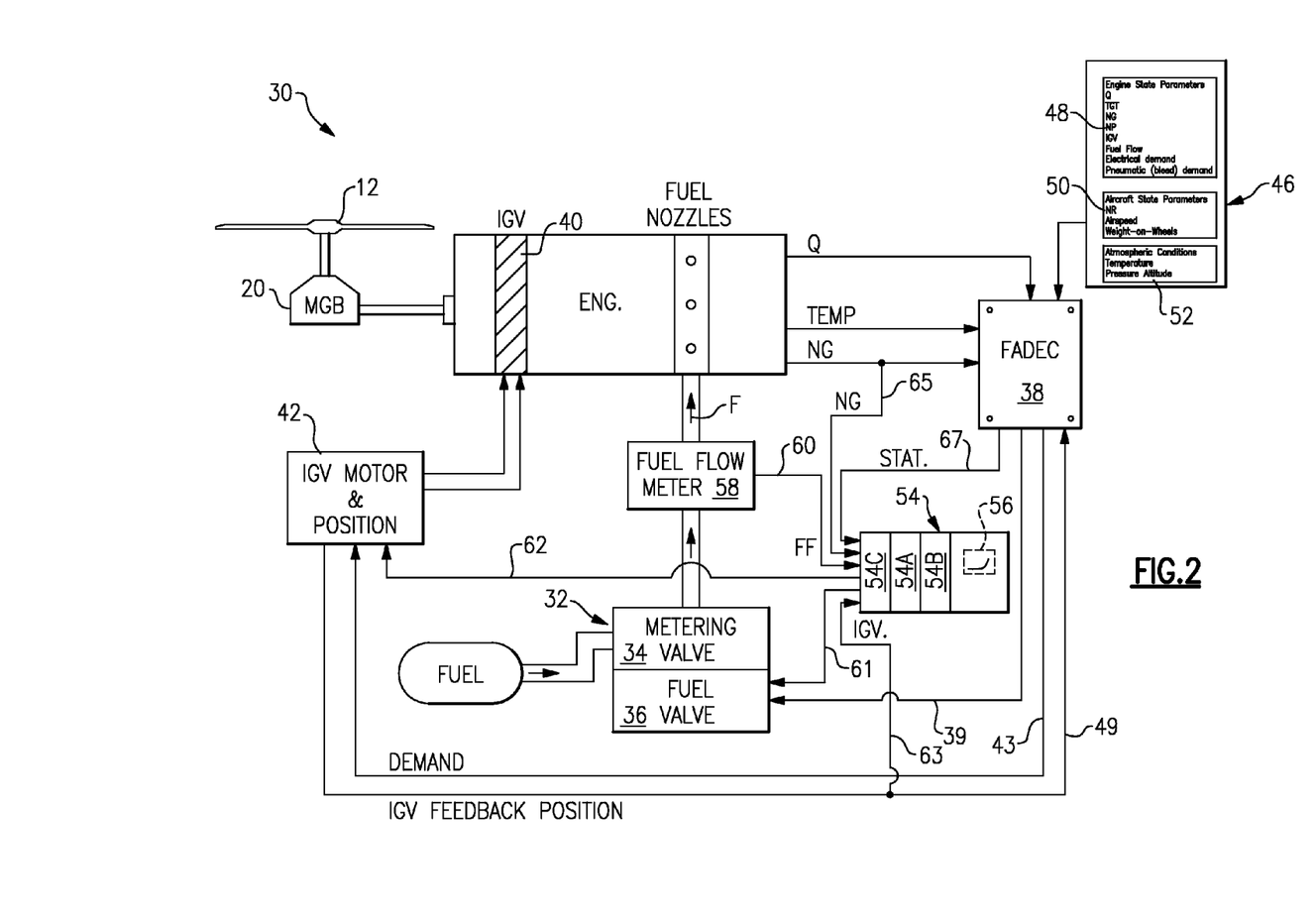
FIG. 2 is a block diagram of an exemplary engine control system which includes a module to implement a fail-fixed algorithm.

Referring to FIG. 2, an engine control system 30 for one engine ENG of the multi-engine powerplant system 22 is schematically illustrated in block diagram format. A metered supply of fuel F is communicated to the engine ENG through a fuel control unit 32. The fuel control unit 32 includes a metering valve 34 which is operated by a metering valve actuator 36.

Primary or normal control of the engine ENG is accomplished with an automatic electronic control, typically a Full Authority Digital Engine Control (FADEC) 38 which is electronically coupled by communication lines 39 to the fuel control unit 32. The FADEC 38 controls the metering valve actuator 36 to adjust the metering valve 34 and control the supply of fuel F to the engine ENG. The FADEC 38 provides a steady-state fuel flow boundary to operate the engine with an over/under transient range to enable the engine to accelerate or decelerate to control of the engine ENG in response to desired operational conditions within established engine and MGB speed, torque and temperature limits.

An inlet guide vane (IGV) system 40 of the engine ENG is operated by an IGV actuator 42. The angle of incidence of inlet air is maintained within a stall-free operating range by the IGV system 40. As the stall-free operating range varies with Gas Generator compressor speed (NG), the angle of attack of the IGV system 40 is adjusted generally in response to changes in compressor speed and operating air density. The FADEC 38 is electronically coupled by communication lines 43, 44 to the IGV actuator 42 to provide the requisite angle of attack and to monitor/control the IGV actuator 42 position.

The FADEC 38 receives numerous inputs from a sensor system 46. The sensor system 46 may include engine state parameter data 48, aircraft state parameter data 50, and environmental parameter data 52. The engine state parameter data 48 may include, but not be limited to: Torque (Q), Turbine Gas Temperature (TGT), Gas Generator Compressor speed (NG), Power turbine speed NP, IGV position, Fuel flow, Electrical demand, and Pneumatic demand. The aircraft state parameter data 50 may include, but not be limited to: Rotor Speed (NR), Airspeed, collective pitch position, throttle position, various discrete inputs such as ignition demand, bleed demand, etc and weight-on-wheels. The environmental parameter data 52 may include, but not be limited to: outside air temperature (OAT) and pressure altitude. The FADEC 38 provides signal conditioning for primary operational control of the engine ENG and refines engine operation through correlation with the engine state parameter data 48, aircraft state parameter data 50 and environmental parameter data 52 as well as other data.

The engine control system 30 further includes a module 54 (FIG. 3) which provides secondary control to assure that the engine ENG will fail-fixed to one of a multiple of pre-determined modes in response to failure of the FADEC 38. The module 54 continuously monitors the state of the engine ENG control system to identify the point of failure of the FADEC 38.

Figure 3:
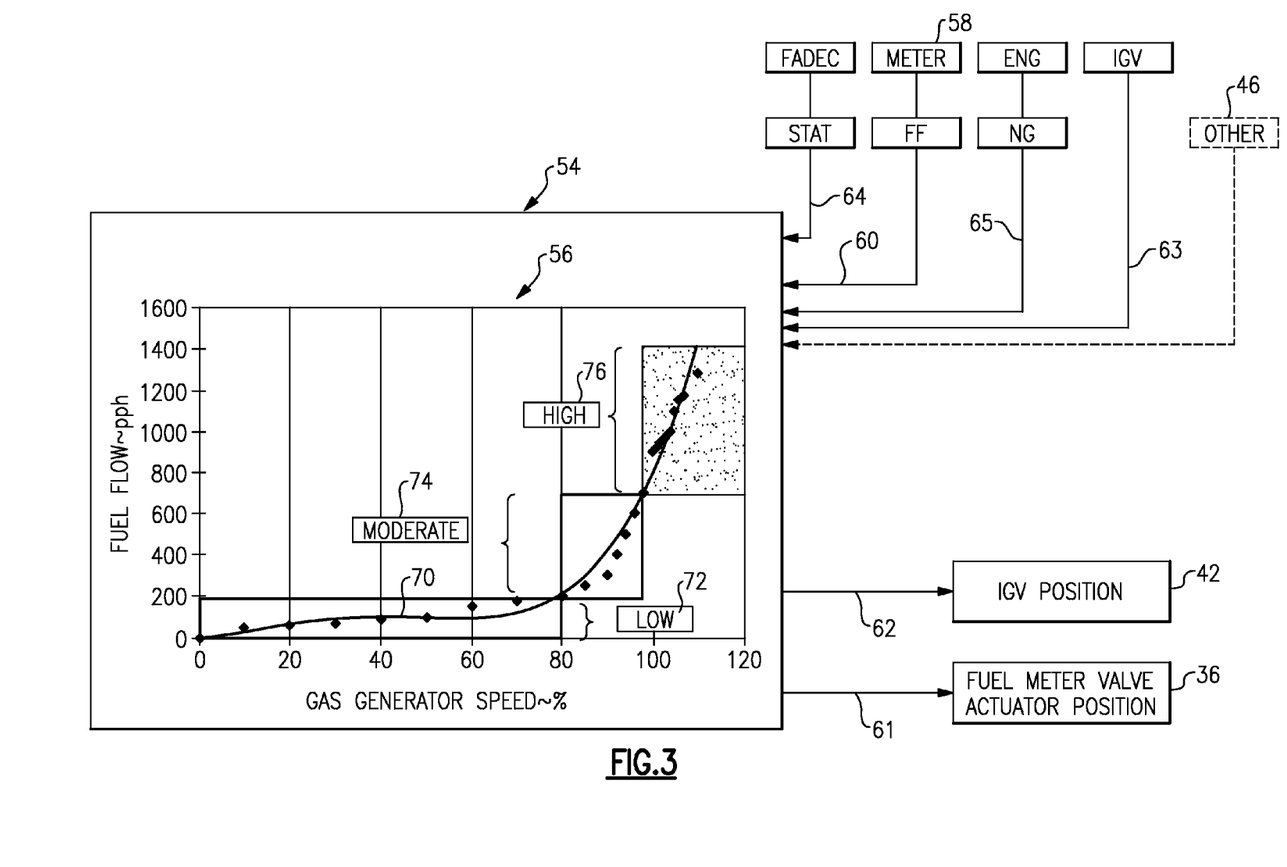
FIG. 3 is a block diagram of the module to implement the fail-fixed algorithm.

The module 54 may be a relatively uncomplicated unit as compared to the FADEC 38. The term "module" as utilized herein may include dedicated or multi-functional hardware or software within the FADEC 38, a stand-alone module as illustrated in the disclosed non-limiting embodiment, a mechanical/electrical interface, a portion of the fuel control unit 32 or other system. In one non-limiting embodiment, the module 54 is a stand-alone hardwired circuitry unit located remotely from the FADEC 38 so as to be isolated should the FADEC 38 receive ballistic or other damage.

The module 54 may include a processor 54A, a memory 54B, and an interface 54C (FIG. 3). The processor 54A may be a custom made or commercially available power PC type processor, a central processing unit, a processor among several processors, a semiconductor based microprocessor in the form of a microchip or chip set or generally any device for executing instructions stored in memory 54B to provide the desired performance characteristics. The memory 54B can include any one or combination of volatile memory elements, for example, random access memory such as RAM, DRAM, SRAM, SDRAM, VRAM, hard drive etc. and/or nonvolatile memory elements, for example, ROM, FLASH, etc. Note that the memory 54B may also have a distributed architecture, where various components are situated remotely from one another, but can be accessed by the processor 54A.

In another non-limiting embodiment, the module 54 is a mechanical/electrical interface with the fail-fixed to one of a multiple of pre-determined modes pre-determined or pre-set within the fuel control unit 32. That is, the module 54 need not require a central processor unit and may be controlled through a mechanical system such as a spring and cam arrangement which operates the metering valve actuator 36 to position the metering valve 34 at a multiple of predefined positions to provide the pre-determined modes.

The module 54 receives fuel flow data from a fuel flow meter 58 over the interface 54C by communication lines 60. The fuel flow meter 58 is in direct in communication with the metered supply of fuel F to receive a direct measurement of the fuel flow which is then communicated to the engine ENG and backup control module 54 irrespective of FADEC 38 operational capability. The module 54 communicates with the metering valve actuator 36 over a communication line 61 to operate the metering valve 34.

The module 54 is also electronically coupled by communication lines 62, 63 to the IGV actuator 42 to receive a direct feedback measurement of the angle of attack of the IGV system 40 irrespective of FADEC 38 operational capability. The module 54 communicates with the IGV actuator 42 to control the angle of attack of the IGV system 40.

The module 54 operates independent of the FADEC 38 and essentially operates in the background thereof. The module 54 utilizes feedback data to track FADEC 38 operation to recognize the instant of FADEC 38 loss. The module 54 receives FADEC 38 operational status over the interface 54C through communication lines 64. The module 54 thereby continuously monitors a FADEC "heart-beat" signal which may be a digital data bit indicating operational status of a simple voltage on a pin.

The FADEC 38, when healthy, continuously monitors the health thereof and communicates a health status signal. If the FADEC 38 fails through a detected fault, the failure will be communicated, for example, loss of its metering value control communication is a detected fault which does not affect the health status communication signal such that the FADEC 38 will post FAILED and relinquish control such that module 54 will assume secondary operation of the engine ENG. Alternatively, if the FADEC 38 receives instantaneous damage, such as ballistic damage, the FADEC 38 health status signal is lost. The cessation of the FADEC 38 health status signal will be identified through the communication lines 64 in lieu of a FAILED declaration from the FADEC 38. The module 54 will thereby deduce that the FADEC 38 has failed through logic routines stored in memory 54B or with hardware confirmation through, for example, voltage monitoring.

Background operation of the module 54 may include data signals which are not utilized directly by the FADEC 38 or signals that require minimal signal conditioning and are thereby available directly from the data signal source itself such as the engine ENG. This assures that that the module 54 receives signal data independent of the FADEC 38. In one non-limiting embodiment, the fuel flow data from communication lines 60 are communicated directly to the module 54 and Gas Generator Compressor speed (NG) is communicated directly from the engine ENG over communication line 65. Fuel flow data from the fuel flow meter 58 is not typically a direct input to the FADEC 38 and Gas Generator Compressor speed (NG) does not necessarily require FADEC signal conditioning as compared to, for example, Torque (Q), or Turbine Gas Temperature (TGT). It should be understood that this or other signal data may alternatively or additionally be communicated to the module 54.

Figure 4:
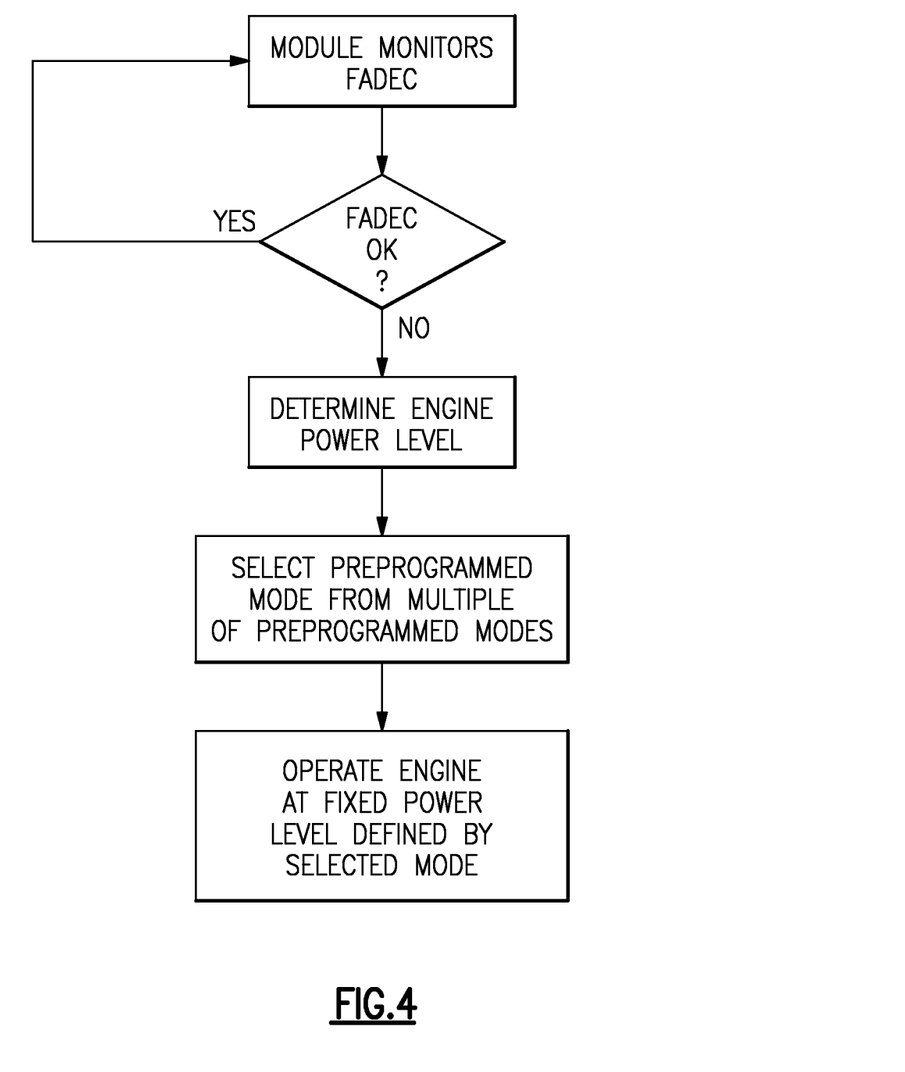
FIG. 4 is a flowchart illustrating operation of the fail-fixed algorithm.

The module 54 executes an adaptive fail-fixed algorithm 56 (FIG. 4). The functions of the algorithm 56 are disclosed in terms of functional block diagrams, and it should be understood by those skilled in the art with the benefit of this disclosure that these functions may be enacted with dedicated hardware circuitry or programmed software routines.

Upon recognition of automatic FADEC 38 control loss, the module 54 will fail-fix the engine ENG to one of a multiple of pre-determined modes. The adaptive fail-fixed algorithm 56 utilizes the fuel flow data from the fuel flow meter 58 and the Gas Generator compressor speed (NG) from the engine ENG for determination of the engine ENG state at the moment of FADEC loss of control as compared to a pre-determined idealized fuel flow to NG relationship (illustrated graphically as line 70 in FIG. 3). The idealized fuel flow to NG relationship 70 need not be as precise as that provided by the FADEC 38 (illustrated schematically by example diamond points in FIG. 3) for primary operational control of the engine ENG, as the FADEC 38 will typically provide highly refined operation through correlation with the engine state parameter data 48, aircraft state parameter data 50 and environmental parameter data 52 communicated to the FADEC 38, however, such correlation data need not be utilized, as such data may unnecessarily complicate operation of the module 54 and essentially become another FADEC channel.

In one non-limiting embodiment, the multiple of pre-determined modes may include a low power mode 72, a moderate power mode 74 and a high power mode 76 as schematically represented by the boxed ranges along the idealized fuel flow to NG relationship 70 (FIG. 3). The power modes 72, 74, 76 may be related to predefined fuel flow ranges, as disclosed in the non-limiting embodiment, or other such variable. The mode selected from the multiple of pre-determined modes is determined in response to fuel flow in pounds-per-hour (pph) and/or compressor speed NG with reference to the idealized fuel flow to NG relationship 70. Within the low power mode 72, the moderate power mode and the high power mode 76, the module 54 will fail-fix the engine ENG in accord with the adaptive fail-fixed algorithm 56.

Low Power Mode—0-200 pph Fuel Flow/0-80% NG

Within the low power mode, the module 54 may elect to shut-down the engine ENG; or complete the engine start and fail-fix the engine ENG at idle. The shutdown range may be minimized to assure at least idle power which provides electrical, hydraulic and/or bleed flow generation. The module 54 may, for example, utilize one or more additional sensor signals to determine whether the engine ENG will be shut-down or complete the start to a utility-sustaining idle speed.

The idle state may be set as a default condition of the metering valve 34 if all power is removed as contrasted with conventional systems in which the default condition is fully-closed. The idle state may further allow completion of engine start.

Moderate Power Mode—200-750 pph Fuel Flow/80-100% NG

Within the moderate power mode, the module 54 shall maintain the faulted engine on-line, fail-fixed at a moderate power level. The moderate power level may, in one non-limiting embodiment, be related to Nap-of-Earth power lever requirements.

The failed-fixed state at the moderate power level need only retain power to the metering valve 34 so as to hold position and avoid an any further movement commands.

High Power Mode—900-1400 pph Fuel Flow/100-120% NG

Within the high power mode, the module 54 may shut-down the engine ENG; idle the engine ENG; or "park" the engine ENG at a moderate fuel flow. The module 54 may, for example, utilize one or more additional sensor signals to determine which of these defaults states should be employed.

The shut-off state from the high power level, may be a command to an aircraft fuel selector valve to off. The aircraft fuel selector valve is independent of the metering valve 34. An overspeed protection solenoid may alternatively or additionally be utilized.

In operation, should the FADEC 38 fail or be damaged, the module 54 adapts to the situation at the moment of automatic control failure and selects one of the multiple of pre-determined modes to operate the engine Eng in accords with the selected mode so that the engine ENG is operationally safe, yet may be operated at a power level which is at least minimally productive in an essentially hands-off manner. The aircrew may thereby remain attentive to the flight profile, rather than direct attention to the faulted engine ENG. Notably, with a complete FADEC failure, the aircrew may not even have access to full engine instrumentation—the engine status is "black" since this communication originates from the failed FADEC. The module 54 facilitates continued effective aircraft operations even with engine instrumentation in a "black" condition, given that the aircrew will have confidence that the engine will not run-away or suffer catastrophic damage from being operated outside of permissible limits.

In general and at the most basic operational response, the module 54 will shut-down the engine should the FADEC fail when the engine is operating within the low power mode 72 such as at a point during the engine start cycle where a fail-fixed condition would result in a hung-start and possible engine damage; or fail-fix the engine should the FADEC fail when the engine is operating in the moderate power mode 74; or idle the engine should the FADEC fail when the engine is operating in the high power mode 76.

During the critical moments which follow FADEC failure within the moderate power mode 74 such as a typical of a nap of the earth flight profile, the faulted engine is fail fixed to provide a moderate power level tolerable by the aircrew—irrespective of whether the engine is operating within a high/low fuel flow transient boundary at the instant of FADEC failure to facilitate, for example, continuation of the nap of the earth flight profile. In other words, should one engine experience a FADEC failure during a nap of the earth flight profile, the module 54 will fail fixed the associated engine ENG in accords with the moderate power mode 74 to provide a moderate power level, for example 600 pph, for nap of the earth flight profiles or the adaptive fail-fixed control will "park" the engine at a tolerable fuel flow condition should the FADEC failure occur at a low fuel condition in which the module 54 will slew the engine up and "park" at 600 pph; or should the FADEC failure occur at a high fuel condition, the module 54 will slew the engine down and "park" at 600 pph. This is in contrast to conventional manual backup systems which will lock-in at the instantaneous fuel flow/power level at the moment of automatic control loss or will otherwise just shut down the engine. Either may result in a forced egress from the nap of the earth flight profile and significantly increase the aircrew workload.

The slewed condition, in one non-limiting embodiment, commands the metering valve up or down until a particular "park" position is reached when under the control of the module 54. The command could be controlled by with reference to the idealized fuel flow to NG relationship 70 in module 54.

Alternatively, the slewed condition may be achieved electro-mechanically through the metering valve 34. The metering valve 34 may include a stop set to, for example, 600 pph at which the metering valve 34 will stop when under control of the module 54. The metering valve 34 may be movement damped through a spring bias arrangement set at a rate at which the engine ENG will tolerate. The module 54 may further remove power/actuation from the IGV system 40 which will then default to an open condition such that this "open-loop" slew to a pre-determined spot will proceed without engine upset, surge or flameout.

In one operational example, the engine ENG is within the 0-200 pph fuel flow range. The FADEC 38 is in operational control of the engine and the module 54 operates in the background to monitor NG, fuel flow and FADEC health. If the FADEC fails, the FADEC fails the fuel metering valve at the last fuel flow level demanded within the 0-200 pph range. The module 54 has information that the engine ENG is within the 0-200 pph fuel flow range and that the module 54 is now in control since the FADEC health status signal no longer exists. At the moment of transfer, the idealized Ng to Fuel Flow relationship 70 is consulted to identify that the fuel flow is within the low power mode 72 such that module 54 will either shut-down the engine ENG in accords with the adaptive fail-fixed algorithm 56 or complete the start to the idle speed condition or simply hold fail-fixed at the idle speed condition if that was the condition at the moment of FADEC failure.

In another operational example, the engine is within the 200-900 pph fuel flow range. The FADEC 38 is in operational control of the engine and the module 54 operates in the background to monitor NG, fuel flow and FADEC health. If the FADEC fails, the FADEC fails the fuel metering valve at the last fuel flow level demanded within the 200-900 pph range. The module 54 has information that the engine ENG is within the 200-900 pph range and that the module 54 is now in control since the FADEC health status signal no longer exists. At the moment of transfer, the idealized Ng to Fuel Flow relationship 70 is consulted to identify that the fuel flow is within the moderate power mode 74 such that module 54 will allow the engine ENG to remain at the FADEC fail-fixed fuel flow level in accords with the adaptive fail-fixed algorithm 56.

In another operational example, the aircraft has just conducted a high-power climb-out and the engine is at 100% Q; 1000 pph fuel flow; 95% Ng. The FADEC 38 is in operational control of the engine and the module 54 operates in the background to monitor NG, fuel flow and FADEC health. If the FADEC fails, the FADEC fails the fuel metering valve at the last fuel flow level demanded for the 1000 pph condition. The module 54 has information that the engine ENG is at 1000 pph and that the module 54 is now in control since the FADEC health status signal no longer exists. At the moment of transfer, the idealized Ng to Fuel Flow relationship 70 is consulted to identify that the fuel flow is in the high power mode 76 such that the module 54 will command the fuel metering valve to shut-down the engine ENG in accords with the adaptive fail-fixed algorithm 56.

In another operational example, the aircraft has just conducted a high-power climb-out and the engine is at 100% Q; 1000 pph fuel flow; 95% Ng. The FADEC 38 is in operational control of the engine and the module 54 operates in the background to monitor NG, fuel flow and FADEC health in the background. If the FADEC fails, the FADEC fails the fuel metering valve at the last fuel flow level demanded for the 1000 pph condition. The module 54 has information that the engine ENG is at 1000 pph and that the module 54 is now in control since the FADEC health status signal no longer exists. At the moment of transfer, the idealized Ng to Fuel Flow relationship 70 is consulted to identify that the fuel flow is in the high power mode 76 such that the module 54 will command the metering valve actuator 36 to adjust the metering valve 34 to reduce the fuel flow to a safer lower level, for example 600 pph or other moderate level, so as to "park" the engine ENG at the predetermined fuel flow condition. The adaptive fail-fixed algorithm 56 slews the metering valve actuator 36 relatively slowly to the predetermined fuel flow condition so as to not upset engine operation.

Alternatively, or in addition thereto, when loss of FADEC capability is recognized, the module 54 may command the IGV system 40 to an open position. Although this may result in somewhat less efficient engine operation, reduction of fuel flow with the IGV system 40 at the open position will not result in engine stall. The module 54 may thereafter use the FF and NG signals to command the metering valve actuator 36 to the predetermined fuel flow condition.

Parking of the engine at the moderate level may also be utilized to increase the fuel flow to a higher level, for example 600 pph should FADEC loss occur at a low power level. That is, the engine is parked to a neutral operational state irrespective of whether the FADEC fails with the engine in a high or low power level.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed is:

1. A gas turbine engine control system comprising:
an automatic control operable to control a gas turbine engine; and
a module configured to fail-fix the gas turbine engine to one of a multiple of pre-determined modes in response to failure of said automatic control, said multiple of pre-determined modes each different than said automatic control operative to control said gas turbine engine,
wherein said multiple of pre-determined modes includes a low fuel flow power mode, a moderate fuel flow power mode and a high fuel flow power mode,
wherein said automatic control includes a Full Authority Digital Engine Control (FADEC), and said module is remote from said FADEC.

2. The system as recited in claim 1, further comprising:
a fuel flow meter to sense a fuel flow to said engine;
a fuel control to control said fuel flow to said engine; and
said module in electrical communication with said fuel flow meter to fix said fuel control in response to said one of said multiple of pre-determined modes.

3. The system as recited in claim 2, wherein said one of said multiple of pre-determined modes are selected in part by a fuel flow sensed by said fuel flow meter.

4. The system as recited in claim 2, wherein said one of said multiple of pre-determined modes are selected in part by a compressor speed (NG) of said engine.

5. The system as recited in claim 1, further comprising:
an inlet guide vane actuator operable to control an inlet guide vane system of said engine;
said module in electrical communication with said inlet guide vane actuator to fix said inlet guide vane system in response to said one of said multiple of pre-determined modes.

6. The system as recited in claim 5, wherein said one of said multiple of pre-determined modes are selected in part by a fuel flow sensed by a fuel flow meter, said fuel flow meter to sense a fuel flow to said engine.

7. The system as recited in claim 5, wherein said one of said multiple of pre-determined modes are selected in part by a Compressor speed (NG) of said engine.

8. The system as recited in claim 1, wherein said module includes hardwired circuitry.

9. The system as recited in claim 1 wherein said low fuel flow power mode includes shutdown of the engine.

10. The system as recited in claim 1, wherein said moderate fuel flow power mode includes operation of the engine at a predetermined fixed fuel flow rate.

11. The system as recited in claim 1, wherein said moderate fuel flow power mode includes fixing engine operation at a current fuel flow rate.

12. The system as recited in claim 1, wherein said high fuel flow power mode includes fixing the engine operation to an idle condition.

13. A method for transfer to a backup system in response to automatic engine control failure comprising:
identification of a loss of a Full Authority Digital Electronic Control (FADEC) for automatic engine control;
selecting one of a multiple of preprogrammed backup modes after the identification using a module operating independently from the FADEC, the multiple of pre-determined modes including a low fuel flow power mode, a moderate fuel flow power mode and a high fuel flow power mode; and
operating a gas turbine engine in response to the selected preprogrammed backup mode.

14. A method as recited in claim 13, further comprising:
selecting the one of the multiple of preprogrammed backup modes in response to at least one input from a sensor system.

15. A method as recited in claim 13, further comprising:
selecting the one of the multiple of preprogrammed backup modes in response to a fuel flow in response to an idealized compressor speed (Ng) to Fuel Flow relationship.

16. A method as recited in claim 13, further comprising:
operating the gas turbine at a predetermined fixed fuel flow in response to the selected preprogrammed backup mode.

17. A method as recited in claim 16, further comprising:
changing the fuel flow from the fuel flow at the identification of the loss of automatic engine control to the predetermined fixed fuel flow in response to the selected preprogrammed backup mode.

\* \* \* \* \*